3,471,471
ADENOSINE DERIVATIVES AND THERAPEUTIC PREPARATIONS CONTAINING SAME

Mary Helen Maguire, Mosman, New South Wales, Australia, assignor to The University of Sydney, Sydney, New South Wales, Australia
No Drawing. Filed Sept. 13, 1966, Ser. No. 579,000
Claims priority, application Australia, Sept. 21, 1965, 64,327/65
Int. Cl. C07d 51/54; A61k 27/00
U.S. Cl. 260—211.5                                    4 Claims

ABSTRACT OF THE DISCLOSURE

This invention relates to adenosine derivatives and therapeutic preparations containing same, and in particular to $N^6$-methylated-2-substituted adenosines and to therapeutic preparations thereof for use as vasodilators or hypotensive and/or anticoagulant drugs, having a long duration of action in warm blooded mammals.

---

The invention relates to the hereinafter specified $N^6$-methylated-2-substituted adenosines as novel compounds per se and also to methods of preparation thereof as hereinafter defined. The 2-substituent may be any electron-attracting group, but is preferably small in size for maximum therapeutic activity.

This invention particularly relates to the following $N^6$-methylated-2-substituted adenosines:

2-chloro-$N^6$-methyladenosine,
2-methylthio-$N^6$-methyladenosine,
2-ethylthio-$N^6$-methyladenosine,
2-trifluoromethyl-$N^6$-methyladenosine,
2-methoxy-$N^6$-methyladenosine,
2-ethoxy-$N^6$-methyladenosine,
2-cyano-$N^6$-methyladenosine,
2-bromo-$N^6$-methyladenosine,
2-azido-$N^6$-methyladenosine and
2-fluoro-$N^6$-methyladenosine.

They may be prepared in several ways, of which the following methods are exemplary:

(1) By reaction of the chlormercury derivative of the appropriate purine (e.g., 2-chloro-$N^6$-methyladenine, 2-methylthio - $N^6$ - methyladenine, 2 - ethylthio-$N^6$-methyladenine, 2 - trifluoromethyl - $N^6$ - methyladenine, 2-azido-$N^6$ - methyladenine and 2 - cyano - $N^6$ - methyladenine) with 2:3:5-triacylribofuranosyl chloride in boiling xylene followed by treatment of the product with methanolic ammonia at 0°.

(2) By fusion of the appropriate 2-substituted 6-chloro - purine (e.g., 2:6 - dichloropurine, 2,6 - dibromopurine, 2 - methylthio - 6 - chloro - 9 - acetylpurine, 2-ethylthio - 6 - chloropurine and 2 - trifluoro-methyl - 6-chloropurine) with a tetracylribofuranose, and treatment of product with methylamine in methanol.

(3) When the 2-substituent is an alkoxy-, cyano- or alkylthio-group, by reaction of a salt of the group (e.g., sodium methoxide or cuprous cyanide with 2-chloro-$N^6$-methyladenosines.

The invention will be further illustrated by the following examples.

EXAMPLE 1

Preparation of 2-chloro-$N^6$-methyladenosine

2 - chloro - $N^6$ - methyladenine (7.3 g., 40 mmol.) and Celite (14.5 g.) were suspended in water (350 ml.); 10% aqueous sodium hydroxide solution (16 ml.) was added, then a solution of mercuric chloride (10.86 g., 40 mmol.) in ethanol (350 ml.) to give a gel-like suspension of chloromercuri-2-chloro-$N^6$-methyladenine and Celite. This stood overnight and was filtered; the solid was dried, suspended in boiling anhydrous xylene, and further dried by azeotroping. A solution of 2:3:5-tri-O-benzoylribofuranosyl chloride (17.8 g. 40 mmol.) in dry xylene (80 ml.) was added to the hot stirred suspension.

The reaction mixture was refluxed and stirred for 3 hours, cooled and filtered. The filter cake was washed with hot chloroform (3× 50 ml.). The xylene filtrate was evaporated in vacuo to an oil which was dissolved in chloroform (150 ml.) The chloroformic solutions were combined and washed with 30% potassium iodide (2× 100 ml.) and water (100 ml.) and dried ($Na_2SO_4$). The solution was evaporated to a brown oil, which was dissolved in dry methanol (200 mml.) saturated with ammonia at 0°, and the mixture was kept for 3 days at 2°. Methanol was evaporated and the residual oil was extracted with water (10 ml.) and chloroform (3× 50 ml.). The aqueous extract was evaporated to a brown oil, which on trituration with ethanol gave crystalline 2-chloro-$N^6$-methyladenosine (6.1 g.) which was recrystallized twice from methanol as white plates 4.3 g., M.P. 195–197° resolidifying and not melting <300°. Another recrystallization from methanol gave the analytically pure material having a melting point of 205–207°. The empirical formula is proved by the following analysis. $C_{11}H_{14}O_4N_5Cl$ required C, 41.84; H, 4.47; N, 22.19. Found: C, 41.88; H, 4.75; N, 21.87%.

EXAMPLE 2

Preparation of 2-chloro-$N^6$-methyladenosine

A mixture of 18.9 g. (0.1 mole) of 2-6,dichloropurine and 50.4 g. (0.1 mole) of 1-O-acetyl-2,3,5-tri-O-benzoyl-D-ribofuranose was heated in vacuo at 140° in a rotating flask. A clear melt was soon obtained and a vigorous evolution of acetic acid occurred. Heating was continued for 40 minutes. (A catalyst, p-toluene-sulphonic acid, may be added after fusion of the material, but is not required if the dichloropurine is pure.)

The flask was cooled to room temperature and the product was dissolved in chloroform (500 ml.). The chloroform solution was washed with saturated aqueous sodium hydrogen carbonate (3× 200 ml.) and with two 100 ml. portions of water, filtered and dried ($Na_2SO_4$). Evaporation of chloroform left a clear pale yellow glass which was triturated with n-hexane to give the blocked 2:6-dichloropurineriboside as a creamy white powder. This product (5 g.) was treated with 300 ml. of anhydrous methanol, and the mixture was saturated with anhydrous methylamine at 0°. The mixture was kept for 3 days at 3°, then in an autoclave at room temperature for 2 days. Methanol was evaporated to a clear brown glass which was dissolved in water (50 ml.). The aqueous solution was extracted with chloroform (3× 20 ml.) and evaporated to a viscous brown oil. Trituration of this with methanol gave brownish crystals (1.34 g.) of 2-chloro-N⁶-methyladenosine. The product was recrystallized from methanol to give 1.1 g. of white plates, M.P. 205.207°. A mixed M.P. with 2-chloro-N⁶-methyl-adenosine obtained by the procedure of Example 1 and comparison of spectral properties showed this compound to be 2-chloro-N⁶-methyladenosine.

EXAMPLE 3

Preparation of 2-methylthio-N⁶-methyladenosine 2-methylthio-6-chloropurine (3.5 g. 17.4 mmole) was heated under reflux with acetic anhydride (350 ml.) and the mixture was evaporated to dryness. The residue was recrystallised from chloroform as needles (3.95 g.), M.P. 142–145° C. The acetylated purine (3.95 g.) was heated in vacuo in a rotating flask with 1-O-acetyl-2:3:5 tri-O-benzoyl-β-D-ribofuranose (8.82 g.) at 130–140° until a clear melt was obtained: this was cooled, p-toluenesulphonic acid (30 mg.) was added and the mixture was again heated in vacuo at 130–140° when a brisk effervescence occurred and the melt darkened considerably. The product was cooled and dissolved in $CHCl_3$ (100 ml.). The chloroform solution was extracted with saturated aqueous $NaHCO_3$ (1× 50 ml.) and with water (2× 50 ml.) and dried ($Na_2SO_4$). $CHCl_3$ was evaporated leaving a dark residue. This was triturated with methanol (50 ml.) to give a dark solution and black insoluble solid. The methanol solution was decanted from the solid (0.98) and treated with charcoal, filtered and evaporated to give a pale yellow residue. This was treated with $CHCl_3$ (50 ml.) and 1.35 g. of recovered 2-methylthio-6-chloropurine was filtered off. Chloroform was evaporated from the filtrate and the residue was triturated with n-hexane (3× 50 ml.) to give approximately 8 g. of a sticky solid which was dried in vacuo over $P_2O_5$. The dried solid was dissolved in anhydrous methanol and the solution was saturated at 0° with dry methylamine and allowed to stand for 7 days in an autoclave at room temperature. Methanol was evaporated leaving a dark brown glass. This was triturated with acetone and the acetone solution was decanted from a black tar and evaporated to a dark residue, which was dissolved in water (100 ml.) and extracted with chloroform (100 ml.). The aqueous layer was evaporated to 25 ml. and slow evaporation of this solution in air at room temperature yielded 0.85 g. of brown crystals M.P. 115–120°. The product was recrystallised four times from methanol to give 0.4 g. of white needles, M.P. 170–171°. The formula is proved by the following analysis. $C_{12}H_{17}N_5O_4S$ requires C, 44.03; H, 5.23; N, 21.39. Found: C, 44.00; H, 5.26; N, 21.27.

EXAMPLE 4

Preparation of 2-methoxy-N⁶-methyl adenosine 2-chloro-N⁶-methyl adenosine (1.0 g.) was dissolved in hot anhydrous methanol, and 8 ml. 2 N sodium methoxide were added. The solution was heated under reflux for 50 hours, cooled, neutralized with N HCl and evaporated to dryness in vacuo. The white residue was extracted with dry ethanol (100 ml.) and filtered. Evaporation of the filtrate left a colorless gum, which was dissolved in water (50 ml.). The solution was filtered, concentrated in vacuo to 10 ml., and kept at 2°. Crystals (0.75 g.) separated, and 2 recrystallizations of the product from 50% aqueous ethanol gave pure 2 methoxy-N⁶-methyladenosine. The empirical formula is proved by the following analysis. $C_{12}H_{17}N_5O_5H_2O$ required C, 43.77; H, 5.87; N, 21.27. Found: C, 43.93; H, 6.21; N, 21.22%.

Tests on laboratory animals have indicated that N⁶-methylated-2-substituted adenosines have potential therapeutic activity and that they may be used where vasodilatation is required or when anticoagulation is desirable, or where increase in coronary blood flow is required. These compounds cause prolonged vasodilatation on intravenous injection in laboratory animals.

For example 2-chloro-N⁶-methyladenosine when administered intravenously causes a 20% drop in guinea pig blood pressure at a dosage of 150 μg./kg.; the duration of this effect is 30 minutes. A higher dose, 200 μg./kg., causes a short heart block in the guinea pig. The L.D. 50 for this compound in rats and mice is 125 mg./kg. intravenously, 150 mg./kg. intraperitoneally and 320 mg./kg. orally.

2-chloro-N⁶-methyladenosine inhibits the ADP-mediated aggregation of sheep blood platelets in vitro at a concentration of 6.0 μg./ml. of platelet rich plasma when the concentration of ADP is 0.3–0.4 μg./ml.; the half life of this effect is 20 to 30 minutes.

2-trifluoromethyl-N⁶-methyladenosine at a dose of 3,000 μg./kg. causes a 20% drop in guinea pig blood pressure; the duration of this effect is greater than 60 minutes. This compound at 3,000 μg./kg. does not cause heart block in the guinea pig. The L.D. 50 in rats and mice is greater than 65 mg./kg. intravenously and greater than 300 mg./kg. intraperitoneally. It inhibits the ADP mediated platelet aggregation at a concentration of 30 μg./ml. of platelet rich plasma, and this effect has a half life of 10 minutes.

The other compounds are less toxic than 2-chloro-N⁶-methyladenosine; 2-methylthio-N⁶-methyladenosine is as effective in its inhibition of the ADP mediated platelet aggregation as is 2-chloro-N⁶-methyladenosine.

The compounds of the invention are potent inhibitors of cardiac adenosine-deaminase, and may increase coronary blood flow by inhibiting this enzyme, and so prolonging the life of endogenous adenosine.

Indications for the use of these drugs may be as vasodilators in the treatment of vascular disease where peripheral blood flow is inadequate, such as Raynaud's disease or acro-asphyxia, and in the treatment of angina pectoris where dilatation of coronary vessels is indicated, and in the treatment of hypertension.

Further indications may be also in the treatment of vascular disorders where these are accompanied by disorders of the blood clotting mechanism such as Buerger's disease or thrombo-angiitis obliterans.

The drugs may also be indicated in other disorders of the blood clotting mechanism, such as pulmonary embolism and coronary thrombosis, where hyper-adhesive conditions of blood platelets exist.

Administration of the drugs may be made orally, intravenously or intramuscularly.

The following tables give an indication of the physiological activity of some of the compounds of the invention above specified.

| Compound | Toxicity in rats and mice [1] (mg./kg.) administered intraperitoneally (LD 50) [2] |
|---|---|
| 2-chloro-N⁶-methyladenosine | 150 |
| 2-methoxy-N⁶-methladenosine | 100 |
| 2-methylthio-N⁶-methyladenosine | 350 |
| 2-trifluoromethyl-N⁶-methyladenosine | 300 |
| 2-ethylthio-N⁶-methyladenosine | 350 |

[1] A minimum of 10 animals used in each toxicity experiment.
[2] All animals survived at this dosage.

| Compound | Inhibition of Adenosine diphosphate induced aggregation of sheep Platelets | |
|---|---|---|
| | Activity (percent compared to adenosine) | ½ life (min.) |
| Adenosine | 100 | 6 |
| 2-chloro-N⁶-methyladenosine | 3–5 | >30 |
| 2-methoxy-N⁶-methyladenosine | 1 | 8 |
| 2-methylthio-N⁶-methyladenosine | 1.5 | >30 |
| 2-trifluoro-N⁶ methyladenosine | 1 | 10 |
| 2-ethylthio-N⁶-methyladenosine | 0.5 | 6 |

What is claimed is:
1. 2-trifluoromethyl-N⁶-methyladenosine.

2. 2-cyano-$N^6$-methyladenosine.
3. 2-azido-$N^6$-methyladenosine.
4. 2-chloro-$N^6$-methyladenosine.

References Cited

UNITED STATES PATENTS

| | | | |
|---|---|---|---|
| 3,380,996 | 4/1968 | Honjo et al. | 260—211.5 |
| 2,482,069 | 9/1949 | Ruskin | 260—211.5 |
| 2,852,506 | 9/1958 | Goldman et al. | 260—211.5 |
| 2,949,451 | 8/1960 | Hoffer | 260—211.5 |
| 3,225,029 | 12/1965 | Yamaoka | 260—211.5 |
| 3,269,917 | 8/1966 | Imada et al. | 260—211.5 |
| 3,308,036 | 3/1967 | Nakayama et al. | 260—211.5 |
| 3,311,610 | 3/1967 | Naito et al. | 260—250 |

LEWIS GOTTS, Primary Examiner

JOHNNIE R. BROWN, Assistant Examiner

U.S. Cl. X.R.

424—180